(12) United States Patent
Sawaoka

(10) Patent No.: US 12,271,174 B2
(45) Date of Patent: Apr. 8, 2025

(54) NUMERICAL CONTROLLER

(71) Applicant: FANUC CORPORATION, Yamanashi (JP)

(72) Inventor: Hiroki Sawaoka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 468 days.

(21) Appl. No.: 17/904,930

(22) PCT Filed: Mar. 4, 2021

(86) PCT No.: PCT/JP2021/008490
§ 371 (c)(1),
(2) Date: Aug. 24, 2022

(87) PCT Pub. No.: WO2021/182305
PCT Pub. Date: Sep. 16, 2021

(65) Prior Publication Data
US 2023/0116068 A1    Apr. 13, 2023

(30) Foreign Application Priority Data

Mar. 11, 2020 (JP) .................. 2020-041461

(51) Int. Cl.
G05B 19/402      (2006.01)
B23Q 15/12       (2006.01)

(52) U.S. Cl.
CPC ........... *G05B 19/402* (2013.01); *B23Q 15/12* (2013.01); *G05B 2219/32105* (2013.01)

(58) Field of Classification Search
CPC ........ G05B 19/402; G05B 2219/32105; G05B 19/404; G05B 19/18; B23Q 15/12
See application file for complete search history.

(56) References Cited

U.S. PATENT DOCUMENTS 8,532,825 B1    9/2013  Freeman
2006/0189255 A1*  8/2006  Akiyama .............. B24B 9/148
                                        451/240

(Continued)

FOREIGN PATENT DOCUMENTS

CN    105717874 A    6/2016
JP    2002-113676 A    4/2002

(Continued)

OTHER PUBLICATIONS

International Search Report issued in PCT/JP2021/008490; mailed May 18, 2021.

*Primary Examiner* — Mohammad Ali
*Assistant Examiner* — Sheela Rao
(74) *Attorney, Agent, or Firm* — Studebaker Brackett PLLC

(57) ABSTRACT

Provided is a numerical controller that can suppress a sudden change in the angle of a rotary axis in the vicinity of a singular point and can also be compatible with any machine configuration. A numerical controller for numerically controlling a designated direction of an axis of a movement axis member by two or more rotary axes. The numerical controller comprises a singular point distance calculation unit for calculating each singular point distance from a rotary axis direction of each of the two or more rotary axes and the designated direction based on an operation command, a rotary axis extraction unit for extracting a control rotary axis for controlling the designated direction based on the singular point distance calculated by the singular point distance calculation unit, and a pulse generation unit for generating a pulse for driving the control rotary axis based on the control rotary axis extracted by the rotary axis extraction unit. The rotary axis extraction unit compares the singular point distances with a preset threshold to extract, as the control rotary axis, the rotary axis exceeding (Continued)

the threshold, or comparing the singular point distances with each other to extract the rotary axis having a larger singular point distance as the control rotary axis.

3 Claims, 6 Drawing Sheets

(56) References Cited

U.S. PATENT DOCUMENTS

| | | |
|---|---|---|
| 2013/0060373 A1 | 3/2013 | Otsuki |
| 2014/0172153 A1 | 6/2014 | Nishibashi |
| 2015/0205284 A1* | 7/2015 | Fujino ................ G05B 19/4103 700/187 |
| 2017/0217491 A1 | 8/2017 | Schmid et al. |

FOREIGN PATENT DOCUMENTS

| | | |
|---|---|---|
| JP | 2008-090734 A | 4/2008 |
| JP | 2009-054186 A | 3/2009 |
| JP | 2009-230552 A | 10/2009 |
| JP | 2011-003176 A | 1/2011 |
| JP | 2011-133968 A | 7/2011 |
| JP | 4837115 B2 | 12/2011 |
| JP | 5105024 B2 | 12/2012 |
| JP | 2013-175229 A | 9/2013 |
| JP | 2015-030078 A | 2/2015 |

* cited by examiner

NUMERICAL CONTROLLER

TECHNICAL FIELD

The present invention relates to a numerical controller.

BACKGROUND ART

There is known a 5-axis machine tool for machining a workpiece as a machining target mounted on a table with two or more rotary axes in addition to three linear axes of an X-axis, a Y-axis, and a Z-axis. Such a 5-axis machine tool includes, for example, a machine tool type in which two rotary axes of an A-axis and a C-axis are arranged on a workpiece side, and a machine tool type in which two rotary axes of the A-axis and the C-axis are arranged on a tool side. In the machine tool type in which two rotary axes are arranged on the tool side, a tilting rotary axis is further arranged on the workpiece side in some cases.

In a numerical controller of the 5-axis machine tool, attitude control is required for rotation of a tool direction according to a command value which is a machining command for the workpiece, or for compensation of the tool direction in workpiece setting error compensation or three-dimensional rotary error compensation. The tool direction is a relative direction of the tool with respect to the workpiece. The attitude control is to control the tool direction which is the attitude of the tool by calculating, from a desired tool direction vector, a rotation angle of each rotary axis to achieve the desired tool direction vector.

Conventionally, Japanese Patent No. 4837115 describes a technique of setting compensation amounts corresponding to four errors of a linear-axis-dependent translational error depending on a linear-axis position, a rotary-axis-dependent translational error depending on a rotary-axis position, a linear-axis-dependent rotary error depending on a linear-axis position and a rotary-axis-dependent rotary error depending on a rotary-axis position in a numerical controller for controlling a 5-axis machine, calculating a translation compensation amount from these compensation amounts, adding the translation compensation amount to a command linear-axis position, calculating a rotary compensation amount from these compensation amounts, and adding the rotary compensation amount to a rotary-axis position, thereby enabling machining to be performed in a tool posture as commanded.

Japanese Patent No. 5105024 describes a technique of keeping an erroneous posture for a tool posture in a reasonably compensable direction while moving the position of a tool tip to an errorless position in a numerical controller for numerically controlling a machine tool having a rectilinear axis and a rotary axis, thereby implementing high-precision machining.

Patent Document 1: Japanese Patent No. 4837115
Patent Document 2: Japanese Patent No. 5105024

DISCLOSURE OF THE INVENTION

Problems to be Solved by the Invention

In the tool posture control of the 5-axis machine tool, the angle of the rotary axis may change extremely greatly near a singular point, so that the rotation speed and acceleration of the rotary axis increase greatly. An example of the singular point is a point at which the tool direction and the rotary-axis direction coincide with each other. At this singular point, the tool direction hardly changes even if the rotary axis is changed. In the tool posture control of the 5-axis machine tool, if the rotary axis suddenly rotates in the vicinity of a singular point when passing through the singular point, the surface quality of a workpiece may be deteriorated.

However, the technique described in Japanese Patent No. 4837115 does not solve the above-mentioned problem in which the rotary axis suddenly changes in the vicinity of the singular point. Therefore, in the technique described in Japanese Patent No. 4837115, there is a risk that a sudden change in the angle of the rotary axis caused by error compensation occurs in the vicinity of the singular point.

On the other hand, the technique described in Japanese Patent No. 5105024 can compensate a three-dimensional rotary error in the tool direction with only an error that does not cause the above-mentioned singular point problem. However, the technique described in Japanese Patent No. 5105024 has a problem that it is limited to a machine configuration in which the direction of the rotary axis does not change on a machine coordinate system, and cannot compensate an error around a specific rotary axis.

Therefore, there has been desired a numerical controller that can suppress a sudden change in the angle of the rotary axis in the vicinity of a singular point and can also be compatible with any machine configuration.

Means for Solving the Problems

A first aspect of the disclosure is a numerical controller for numerically controlling a designated direction of an axis of a movement axis member by two or more rotary axes, the numerical controller comprising: a singular point distance calculation unit for calculating each singular point distance, which is a distance to a singular point, from a rotary axis direction of each of the two or more rotary axes and the designated direction based on an operation command; a rotary axis extraction unit for extracting a control rotary axis for controlling the designated direction from the two or more rotary axes based on the singular point distance calculated by the singular point distance calculation unit; and a pulse generation unit for generating a pulse for driving the control rotary axis based on the control rotary axis extracted by the rotary axis extraction unit, wherein the rotary axis extraction unit compares the singular point distances with a preset threshold to extract, as the control rotary axis, the rotary axis having a singular point distance exceeding the threshold out of the two or more rotary axes, or comparing the singular point distances with each other to extract the rotary axis having a larger singular point distance as the control rotary axis.

Effects of the Invention

According to one aspect of the present disclosure, it is possible to provide a numerical controller capable of suppressing a sudden change in the angle of a rotary axis in the vicinity of a singular point and also compatible with any machine configuration.

PREFERRED MODE FOR CARRYING OUT THE INVENTION

A numerical controller according to one aspect of the present disclosure will be described below with reference to the figures. First, a specific constitution of a machine tool to be numerically controlled by a numerical controller will be described with reference to FIG. 1 and FIG. 2.

Figure 1:
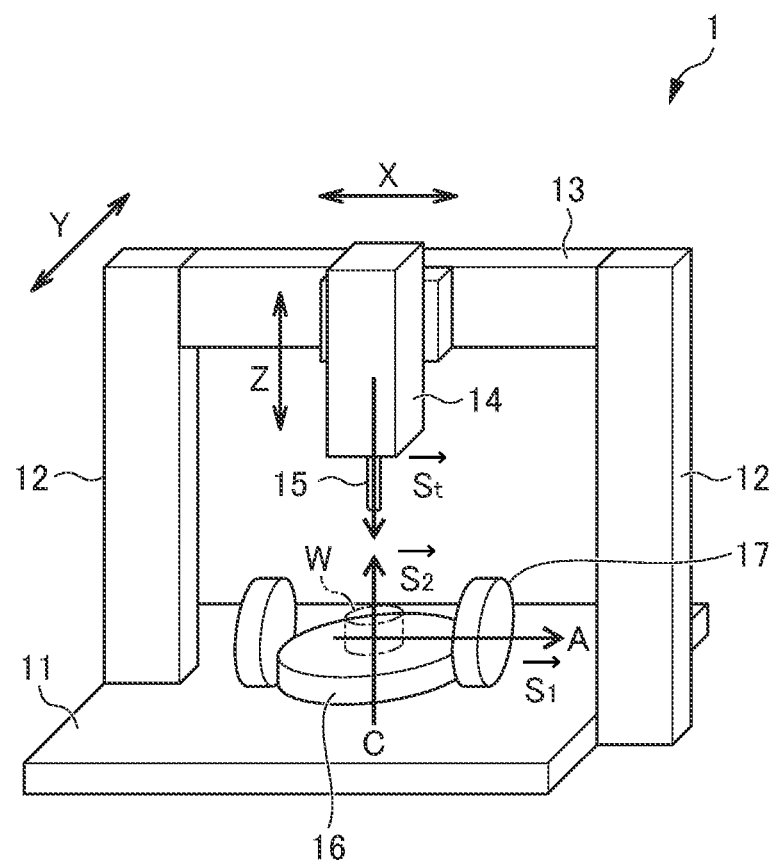
FIG. 1 is a perspective view showing an embodiment of a 5-axis machine tool to be numerically controlled by a numerical controller.

FIG. 1 shows a 5-axis machine tool 1. The 5-axis machine tool 1 includes a bed 11, a pair of column portions 12 and 12 erected on the bed 11, and a rail portion 13 which connects the upper end portions of the column portions 12 and 12 and extends in a lateral direction. A tool head 14 is mounted on the rail portion 13. This 5-axis machine tool 1 has, as linear axes, an X-axis which is a surface direction of the bed 11 and along a longitudinal direction of the rail portion 13, a Y-axis which is a surface direction of the bed 11 and orthogonal to the longitudinal direction of the rail portion 13, and a Z-axis which is perpendicular to the surface direction of the bed 11. The tool head 14 is provided so as to be movable linearly along these three axes of the X-axis, the Y-axis, and the Z-axis. A tool 15 which is a movement axis member projects downward along the Z-axis direction at the lower end of the tool head 14. In FIG. 1, St indicates a tool direction which is an indicated direction of the axis of the tool 15.

On the bed 11 of the 5-axis machine tool 1 are provided a mounting portion 16 for mounting a workpiece W as a machining target thereon and rotating the workpiece W around the C-axis, and a rotary table 17 for rotating the mounting portion 16 around the A-axis along the X-axis direction. The C-axis is arranged in parallel to the Z-axis direction when the mounting portion 16 is arranged vertically to the Z-axis (when the rotation angle of the rotary table 17 is equal to 0°). The two axes of the A-axis and the C-axis in this 5-axis machine tool 1 are rotary axes which are arranged on the workpiece W side and determine the tool direction which is a relative direction of the tool 15 with respect to the workpiece W by rotation thereof. In FIG. 1, S1 indicates the rotary axis of the A-axis. S2 indicates the rotary axis of the C-axis.

Figure 2:
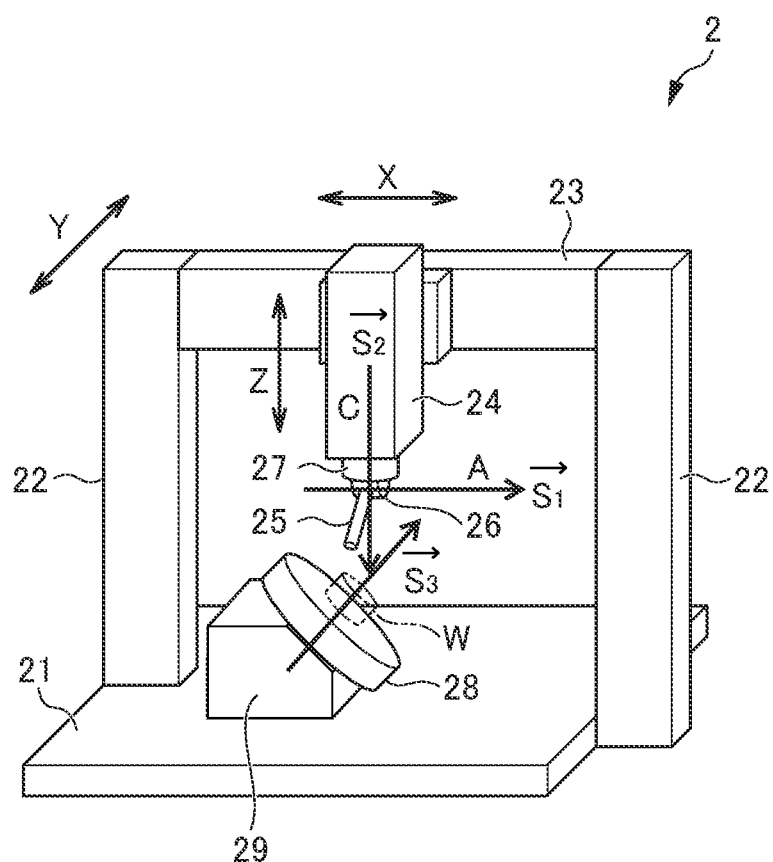
FIG. 2 is a perspective view showing an embodiment of a 6-axis machine tool to be numerically controlled by a numerical controller.

FIG. 2 shows a 6-axis machine tool 2. The 6-axis machine tool 2 includes a bed 21, a pair of column portions 22 and 22 erected on the bed 21, and a rail portion 23 which connects the upper end portions of the column portions 22 and 22 and extends in a lateral direction. A tool head 24 is mounted on the rail portion 23. This 5-axis machine tool 2 has, as linear axes, an X-axis which is a surface direction of the bed 21 and along a longitudinal direction of the rail portion 23, a Y-axis which is a surface direction of the bed 21 and orthogonal to the longitudinal direction of the rail portion 23, and a Z-axis which is perpendicular to the surface direction of the bed 21. The tool head 24 is provided so as to be movable linearly along these three axes of the X-axis, the Y-axis, and the Z-axis.

A tool 25 which is a movement axis member is provided at the lower end of the tool head 24. Specifically, at the lower end of the tool head 24 are provided a first rotating portion 26 for rotating the tool 25 so that the tool 25 swings around the A-axis along the X-axis direction, and a second rotary axis 27 for rotating the first rotating portion 26 around the C-axis along the Z-axis direction. The two axes of the A-axis and the C-axis in this 5-axis machine tool 2 are rotary axes which are arranged on the tool 25 side and determine the tool direction which is a relative direction of the tool 25 with respect to the workpiece W by rotation thereof. A table 28 for mounting a workpiece W as a machining target thereon is arranged on the bed 21. The table 28 is rotatably provided by a third rotating portion 29 that is inclined with respect to the surface direction of the bed 21. In FIG. 2, S1 indicates the rotary axis of the A-axis. S2 indicates the rotary axis of the C-axis. S3 indicates a rotary axis of the third rotating portion 29 which is a tilting rotary axis.

Figure 3:
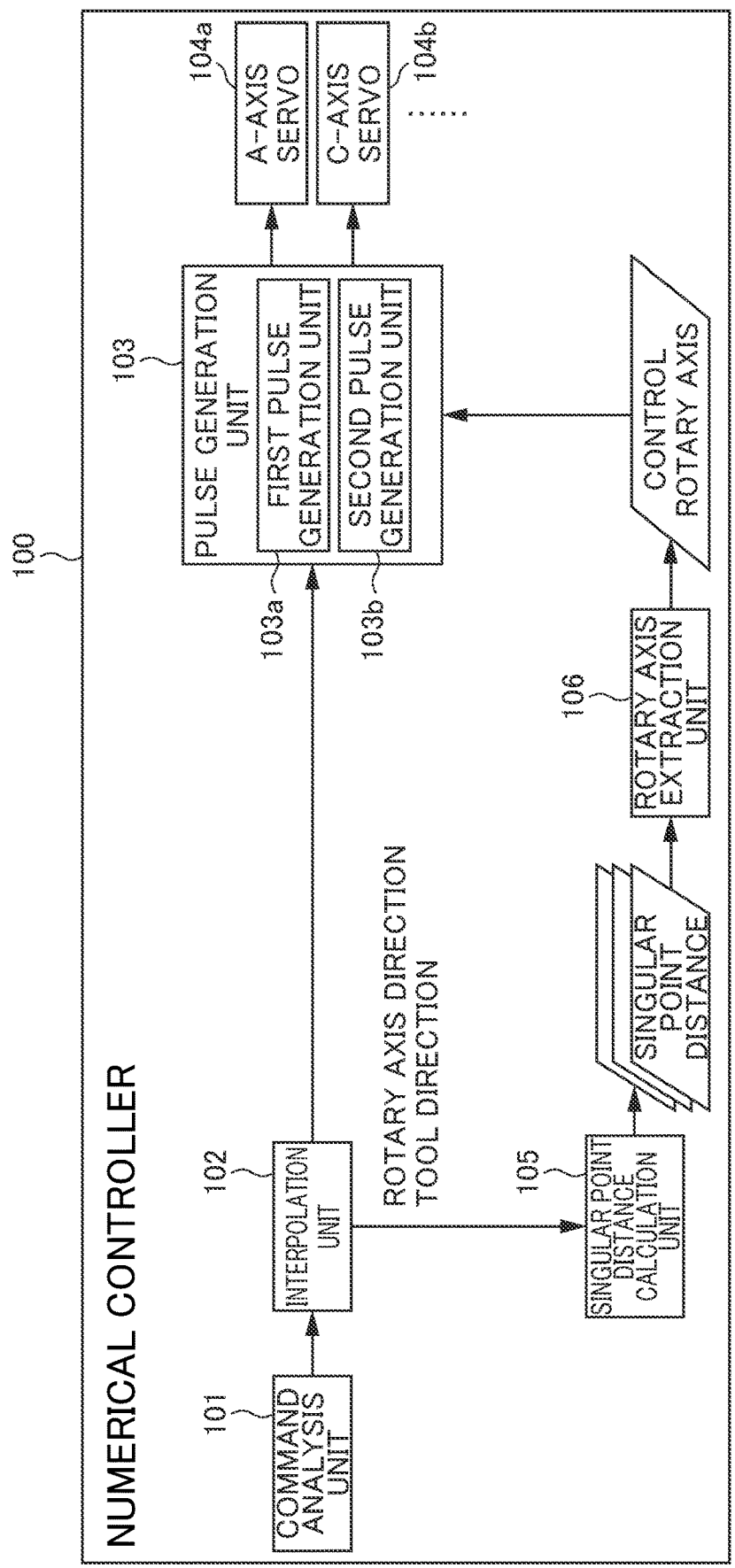
FIG. 3 is a function block diagram showing an embodiment of the numerical controller.

FIG. 3 is a function block diagram showing an embodiment of the numerical controller. In this numerical controller 100, a command analysis unit 101 analyzes a machining program for performing machining on a workpiece W to convert the machining program into an execution format. The command analysis unit 101 outputs an analysis result obtained by the conversion into the execution format to an interpolation unit 102. The interpolation unit 102 performs interpolation processing on the analysis result of the execution format sent from the command analysis unit 101 to generate a movement command containing error compensation for each axis of the 5-axis machine tool 1 and the 6-axis machine tool 2. The interpolation unit 102 outputs the generated movement command for each axis to a pulse generation unit 103. The pulse generation unit 103 generates a drive pulse for driving each axis based on the movement command for each axis sent from the interpolation unit 102. The pulse generation unit 103 outputs the generated drive pulse to a servo control unit for each axis. FIG. 3 shows only a servo control unit 14a for the A-axis and a servo control unit 14b for the C-axis out of servo control units for the respective axes, and servo control units for the X-axis, the Y-axis, the Z-axis, and the tilting rotary axis are omitted from the illustration of FIG. 3. The servo control unit for each axis rotates a motor (not shown) for each axis according to the drive pulse sent from the pulse generation unit 103.

The numerical controller 100 is further provided with a singular point distance calculation unit 105 and a rotary axis extraction unit 106. The singular point distance calculation unit 105 calculates a singular point distance, which is the distance to a singular point, from a rotary axis direction and a tool direction. Specifically, the singular point distance calculation unit 105 receives, from the interpolation unit 102, the rotary axis direction which is the rotation angle of each rotary axis after interpolation processing and the tool direction, and calculates the singular point distance from the thus-received rotary axis direction and tool direction.

Figure 4A:
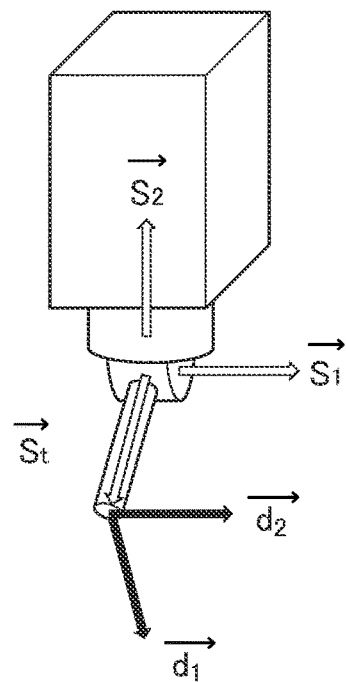
FIG. 4A is a diagram showing a singular point distance.
Figure 4B:
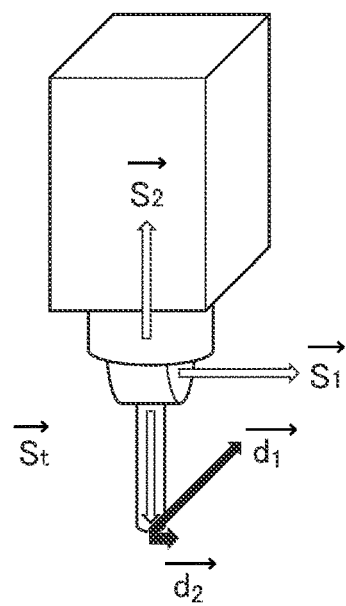
FIG. 4B is a diagram showing the singular point distance.

Here, the singular point distance will be described. The singular point distance is calculated by the outer product of the rotary axis direction and the tool direction. A more specific description will be made with reference to FIG. 4A and FIG. 4B. FIG. 4A and FIG. 4B show two rotary axes of a rotary axis S1 corresponding to the A-axis, and a rotary axis S2 corresponding to the C-axis. St represents the tool direction. The singular point distance of the rotary axis S1 is represented by d1, and the singular point distance of the rotary axis S2 is represented by d2. In this case, the singular point distance d1 and the singular point distance d2 are determined as follows. A singular point distance d3 of the system is a singular point distance of the entire machine tool under the combination of the rotary axis S1 and the rotary axis S2.

SINGULAR POINT DISTANCE OF ROTARY
AXIS S1: $|\vec{d1}|=|\vec{S1}\times\vec{St}|$ SINGULAR POINT DISTANCE OF ROTARY
AXIS S2: $|\vec{d2}|=|\vec{S2}\times\vec{St}|$ SINGULAR POINT DISTANCE OF SYSTEM:
$|\vec{d3}|=|\vec{d1}\times\vec{d2}|$ [Expression 1]

The singular point distance d1 of the rotary axis S1 is the amount of change in the tool direction St when the rotary axis S1 rotates around the A-axis. The singular point distance d2 of the rotary axis S2 is the amount of change in the tool direction St when the rotary axis S2 rotates around the C-axis. In FIG. 4A, there is almost no difference between the singular point distance d1 of the rotary axis S1 and the singular point distance d2 of the rotary axis S2. However, in FIG. 4B, the singular point distance d2 of the rotary axis S2 is smaller than the singular point distance d1 of the rotary axis S1. When the singular point distance is small, the tool direction hardly changes even if the rotary axis rotates. Since the singular point is a point that does not affect the tool direction even if the rotary axis is changed, the value of the singular point distance being small means that the distance to the singular point can be determined to be short. In other words, it can be determined that the rotary axis S2 shown in FIG. 4B is closer to the singular point than the rotary axis S1.

The singular point distance calculation unit 105 calculates the singular point distances from the rotary axis directions of the respective rotary axes and the tool direction sent from the interpolation unit 102, and then outputs these singular point distances to the rotary axis extraction unit 106.

The rotary axis extraction unit 106 compares the singular point distances of the respective rotary axes sent from the singular point distance calculation unit 105 to extract a control rotary axis from two or more rotary axes. The control rotary axis is a rotary axis on which rotation control is performed in order to control the tool direction.

Specifically, the rotary axis extraction unit 106 compares the singular point distance of each rotary axis sent from the singular point distance calculation unit 105 with a preset threshold to extract, as a control rotary axis, a rotary axis whose singular point distance exceeds the threshold among the two or more rotary axes. For example, in the 5-axis machine tool 1 having two rotary axes of the rotary axis S1 and the rotary axis S2, when the singular point distance d1 of the rotary axis S1 is equal to or less than the threshold and the singular point distance d2 of the rotary axis S2 exceeds the threshold, the rotary axis extraction unit 106 does not extract the rotary axis S1 as the control rotary axis, but extracts only the rotary axis S2 as the control rotary axis. When the singular point distance d3 is equal to or less than the threshold, it is considered that the rotary axis S1 and the rotary axis S2 have almost the same rotary axis direction. In this case, in order to uniquely determine an angular solution of each of the rotary axes S1 and S2, when the singular point distance d2 of the rotary axis S2 and the singular point distance d1 of the rotary axis S1 exceed the threshold, the rotary axis S1 which is closer to the tool is extracted as the control rotary axis. The rotary axis extraction unit 106 outputs information regarding the extracted control rotary axis to the pulse generation unit 103.

The pulse generation unit 103 generates a drive pulse for driving the control rotary axis based on the control rotary axis extracted by the rotary axis extraction unit 106. Specifically, the pulse generation unit 103 includes a first pulse generation unit 103a as shown in FIG. 3. When one control rotary axis is extracted by the rotary axis extraction unit 106, the first pulse generation unit 103a outputs a compensation pulse based on error compensation for only the one control rotary axis extracted by the rotary axis extraction unit 106, and pauses the output of a compensation pulse based on error compensation for rotary axes which are not extracted by the rotary axis extraction unit 106. As a result, when passing through the singular point, only the one control rotary axis extracted by the rotary axis extraction unit 106 is driven so as to be closest to the tool direction commanded by a machining command.

For example, when the singular point distance d1 of the rotary axis S1 is equal to or less than the threshold, and the singular point distance d2 of the rotary axis S2 exceeds the threshold, the first pulse generation unit 103a pauses the output of the compensation pulse based on error compensation for the rotary axis S1, and rotationally drives only the rotary axis S2 as the control rotary axis to apply error compensation. At this time, in the first pulse generation unit 103a, only the rotary axis S2 with which error compensation is possible is used to calculate a compensation amount which can also cancel the remaining error at maximum, and generates a drive pulse corresponding thereto.

Specifically, the first pulse generation unit 103a first calculates, for example, an error of the tool direction caused by rotation errors a, b, and c shown below.

$$\delta\vec{St} = \begin{pmatrix} 0 & -c & b \\ c & 0 & -a \\ -b & a & 0 \end{pmatrix}\vec{St}$$ [Expression 2]

Next, as shown below, a compensation amount α1 based on the rotary axis S1 at the time when update is paused is added.

$$\delta\vec{St'}=\delta\vec{St}+\alpha1\vec{d1}$$ [Expression 3]

Next, as shown below, a compensation amount α2 based on the rotary axis S2 which is the control rotary axis which is effective in error compensation is calculated.

$$\alpha2=\delta\vec{St'}\cdot\vec{d2}$$ [Expression 4]

When passing through the singular point, the first pulse generation unit 103a generates a drive pulse corresponding to the calculated compensation amount α2 for the rotary axis S2 which is the control rotary axis. As a result, in the case where a workpiece W is machined by using the two rotary axes S1 and S2 in addition to the three axes of X, Y, and Z, when passing through the singular point, the tool direction is controlled by performing error compensation with only the rotary axis S2 whose singular point distance is larger than the threshold.

Therefore, according to this numerical controller 100, when there are two rotary axes, the error compensation is applied by only the control rotary axis extracted by the rotary axis extraction unit 106, so that it is possible to suppress occurrence of sudden change in the angle of the rotary axis in the vicinity of the singular point, and be compatible with any machine configuration. For other than the singular point, the rotation error in all directions can be compensated, so that there is not any problem that error around a specific axis cannot be compensated. Moreover, since the drive pulse is not limited, there is no possibility that the machining speed decreases.

In the numerical controller 100, when the machine tool is a 6-axis machine tool 2 having three rotary axes S1, S2 and S3 as shown in FIG. 2, the singular point distance calculation unit 105 may calculate singular point distances d12, d23 and d31 by combining the three rotary axes S1, S2 and S3, as shown below.

COMPOSITION 1 SINGULAR POINT DISTANCES OF (ROTARY AXIS S1,ROTARY AXIS S2): $|\vec{d12}|=|(\vec{S1}\times\vec{St})\times(\vec{S2}\times\vec{St})|$ COMPOSITION 2 SINGULAR POINT DISTANCES OF (ROTARY AXIS S2,ROTARY AXIS S3): $|\vec{d23}|=|(\vec{S2}\times\vec{St})\times(\vec{S3}\times\vec{St})|$ COMPOSITION 3 SINGULAR POINT DISTANCES OF (ROTARY AXIS S3,ROTARY AXIS S1): $|\vec{d31}|=|(\vec{S3}\times\vec{St})\times(\vec{S1}\times\vec{St})|$ [Expression 5]

In this case, the rotary axis extraction unit 106 compares a plurality of singular point distances sent from the singular point distance calculation unit 105 with one another to extract, as a control rotary axis, a rotary axis whose singular point distance is largest among two or more rotary axes. In the case of the above-mentioned singular point distances d12, d23, d31, the rotary axis extraction unit 106 selects any one singular point distance having the largest value among the singular point distances d12, d23 and d31, and extracts a combination of rotary axes corresponding to the singular point distance having the largest value as a control rotary axis. For example, when the value of the singular point distance d12 is largest among the singular point distances d12, d23, and d31, the rotary axis extraction unit 106 extracts the two axes of the rotary axes S1 and S2 corresponding to the singular point distance d12 as a control rotary axis.

As shown in FIG. 3, the pulse generation unit 103 includes a second pulse generation unit 103*b*. When two control rotary axes are extracted by the rotary axis extraction unit 106, the second pulse generation unit 103*b* generates a drive pulse for driving each of the two control rotary axes so as to be closest to a tool direction commanded by a machining command. In this case, since the two rotary axes out of the three rotary axes are extracted as control rotary axes, the rotary axes never become the singular point. Therefore, the machine accuracy can be further improved, and also the machining time is further shortened.

Figure 5:
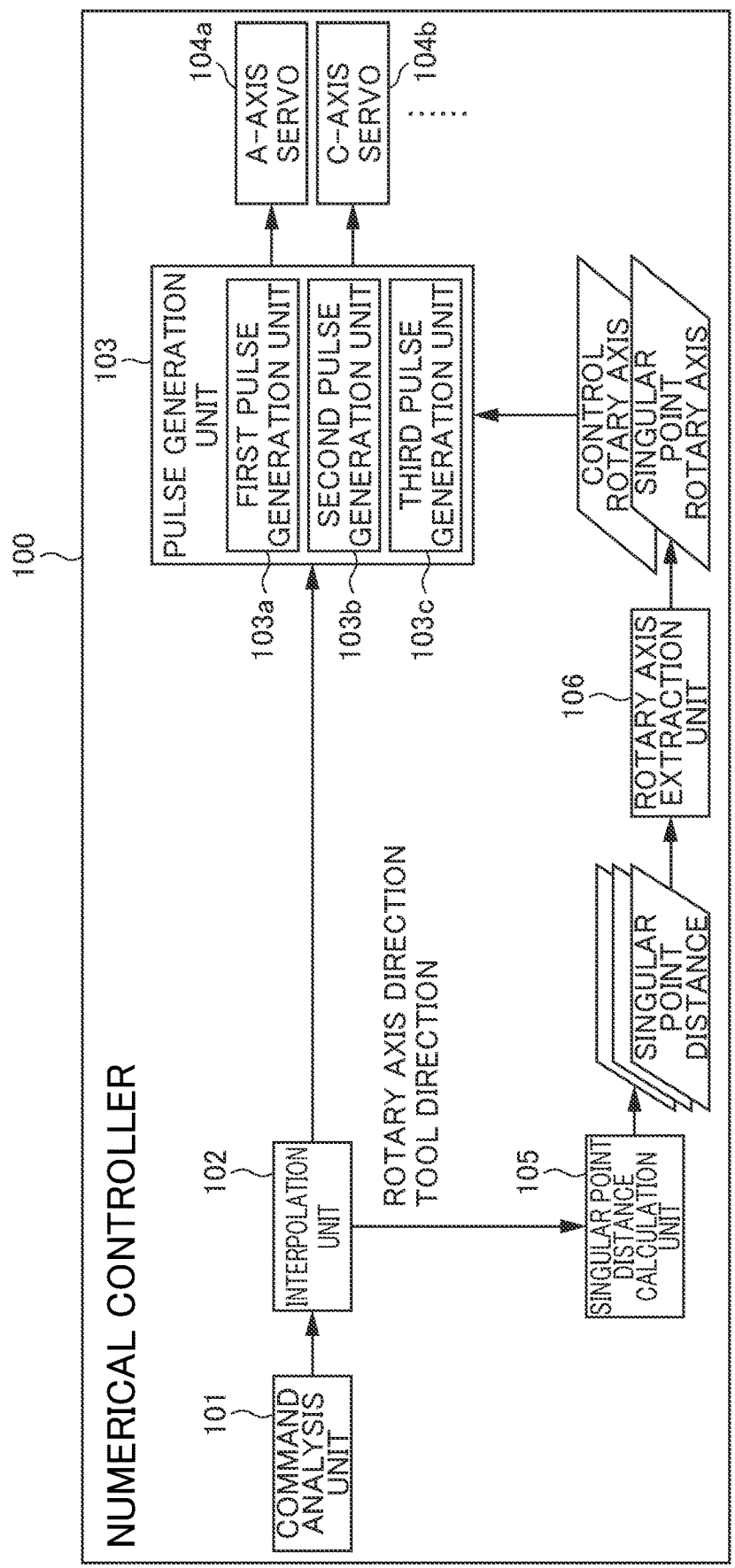
FIG. 5 is a function block diagram showing another embodiment of the numerical controller.

FIG. 5 is a function block diagram showing another embodiment of the numerical controller. In this numerical controller 100A, a third pulse generation unit 103*c* is further added to the pulse generation unit 103. Further, the rotary axis extraction unit 106 is configured to extract a singular point rotary axis in addition to the control rotary axis. Since the other constitution is the same as that of the numerical controller 100 shown in FIG. 3, detailed description thereon will be omitted.

When comparing the singular point distance with the threshold, the rotary axis extraction unit 106 extracts, as a singular point rotary axis, a rotary axis whose singular point distance is within the threshold. In other words, for example, when the rotary axes include the two axes of the rotary axis S1 and the rotary axis S2 and the singular point distance d1 of the rotary axis S1 exceeds the threshold, the rotary axis extraction unit 106 extracts, as a control rotary axis, only one rotary axis S1 whose singular point distance d1 exceeds the threshold. At that time, the rotary axis extraction unit 106 extracts the other rotary axis S2 unextracted as a control rotary axis as a singular point rotary axis whose singular point distance d2 is within the threshold. When passing through the singular point, the third pulse generation unit 103*c* of the pulse generation unit 103 generates, for a singular point rotary axis extracted by the rotary axis extraction unit 106, a drive pulse which is different from the drive pulse for the control rotary axis and drives the singular point rotary axis to rotate until a pre-specified angle.

Figure 6A:
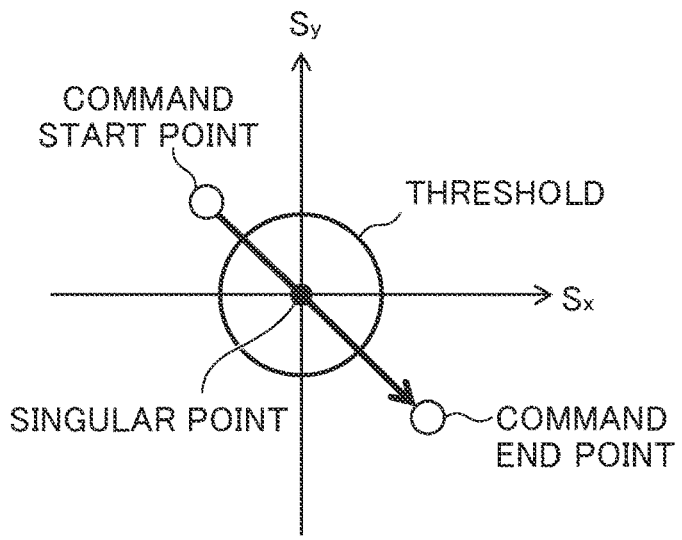
FIG. 6A is a diagram showing a path of a tool direction caused by rotation of a singular point rotary axis that is not controlled by a third pulse generation unit.
Figure 6B:
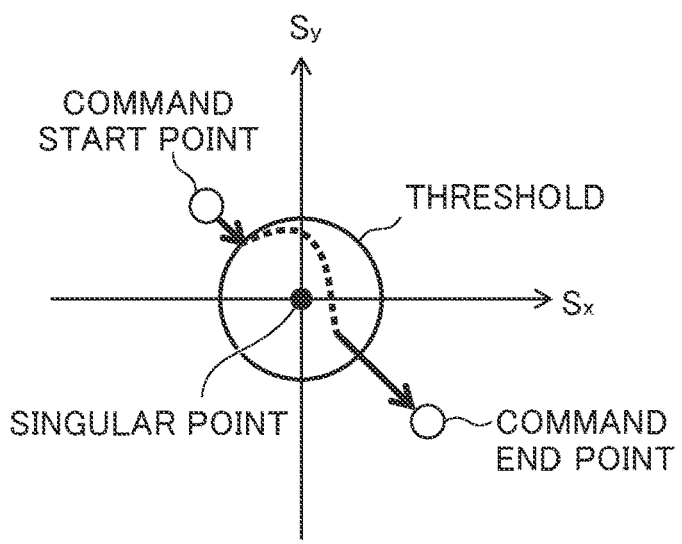
FIG. 6B is a diagram showing a path in a tool direction caused by rotation of a singular point rotary axis that is controlled by the third pulse generation unit.

The drive of this singular point rotary axis will be described with reference to FIG. 6A and FIG. 6B. FIG. 6A and FIG. 6B show tool directions Sy and Sx when the singular point rotary axis is controlled. The center point is the singular point. A circle having a singular point in the center thereof indicates a threshold to be compared with a singular point distance when a control rotary axis is extracted in the rotary axis extraction unit 106. A singular point rotary axis which has not extracted as a control rotary axis moves the tool direction from a command start point to a command end point, the command start point and the command end point being arranged out of the range of the threshold with the singular point being interposed therebetween.

FIG. 6A shows a case where the singular point rotary axis is not controlled by the third pulse generation unit 103*c*. In this case, the tool direction passes through the singular point in the process of moving within the threshold from the start point of the control to the end point of the control. At this time, the rotary axis may change suddenly. On the other hand, the third pulse generation unit 103*c* controls the rotation of the singular point rotary axis so that when the singular point distance d2 of the rotary axis S2 enters the range of the threshold and the rotary axis S2 becomes a singular point rotary axis as shown in FIG. 6B, the rotary axis S2 rotates at a pre-specified angle. The pre-specified angle is an angle smaller than a maximum allowable angle of the rotary axis extracted as the singular point rotary axis (here, the rotary axis S2). The third pulse generation unit 103*c* rotates the singular point rotary axis every pre-specified angle. As a result, the singular point rotary axis starts to rotate gently at the time when it enters the range of the threshold, and moves the tool direction so as to avoid the singular point and reach the end point.

Specifically, the third pulse generation unit 103*c* acquires a command end point tool direction from the command analysis unit 101. Thereafter, the third pulse generation unit 103*c* calculates a command end point angle Ce of the singular point rotary axis from the acquired tool direction. Further, the third pulse generation unit 103*c* acquires a current angle Cn of the singular point rotary axis from the interpolation unit 102. Thereafter, the third pulse generation unit 103*c* calculates, from parameter setting, a maximum rotation pulse δCmax which is a maximum allowance of the drive pulse for rotating the singular point rotary axis.

In the singular point distance calculation unit 105, the singular point distance at the command end point is calculated for the singular point rotary axis. In the rotary axis extraction unit 106, it is confirmed that the singular point distance at the command end point of the singular point rotary axis exceeds the threshold. At this time, when the rotary axis extraction unit 106 confirms that the singular point distance at the command end point of the singular point rotary axis exceeds the threshold, the rotary axis extraction unit 106 confirms that the singular point distance of the singular point rotary axis at present time is within the threshold.

When the singular point distance of the singular point rotary axis at present time is within the threshold, the third pulse generation unit 103c generates a drive pulse for rotating the singular point rotary axis as follows regardless of an interpolation command value interpolated between command values.

In the Case of Ce−Cn>0
   a. in the case of Ce−Cn>δCmax, the singular point rotary axis is rotated by δCmax.
   b. In the case of Ce−Cn<δCmax, the singular point rotary axis is rotated by Ce−Cn.

In the Case of Ce−Cn<0
   a. In the case of −(Ce−Cn)>δCmax, the singular point rotary axis is rotated by −δCmax.
   b. In the case of −(Ce−Cn)<δCmax, the singular point rotary axis is rotated by Ce−Cn.

According to this, the singular point rotary axis starts to rotate gently at the time point when it enters the range of threshold as indicated by a broken line in FIG. 6B, and moves the tool direction so that it avoids the singular point and reaches the end point. Therefore, a sudden change in the angle of the rotary axis which deteriorates the surface quality of the workpiece W can be avoided.

In the above embodiment, the tools 15 and 25 for machining the workpiece W in the 5-axis machine tool 1 and the 6-axis machine tool 2 are illustrated as the movement axis member. However, the movement axis member is not limited to the tools 15 and 25 insofar as it is a movable axis member in which a designated direction, which is a direction indicated by the length direction of the axis, is controlled by the numerical controller. The movement axis member may be, for example, a probe (not shown) or the like which is provided in the machine tool.

In the above embodiment, the singular point distance calculation unit 105 is configured to calculate each singular point distance from the rotary axis direction of each of two or more rotary axes and the tool direction based on the machining command for the workpiece W. However, the singular point distance calculation unit 105 may be configured to calculate each singular point distance from the rotary axis direction of each of two or more rotary axes and the designated direction of the axis of the movement axis member based on an operation command other than the machining command, for example, an operation command such as a movement command of the machine.

EXPLANATION OF REFERENCE NUMERALS 100,100A numerical controller
105 Singular point distance calculation unit
106 rotary axis extraction unit
103 pulse generation unit
103a first pulse generation unit
103b second pulse generation unit
103c third pulse generation unit
S1, S2, S3 rotary axis
St tool direction
W workpiece

The invention claimed is:

1. A numerical controller for numerically controlling a designated direction of an axis of a movement axis member by two or more rotary axes, comprising:
   a singular point distance calculation unit for calculating each singular point distance, which is a distance to a singular point, from a rotary axis direction of each of the two or more rotary axes and the designated direction based on an operation command;
   a rotary axis extraction unit for extracting a control rotary axis for controlling the designated direction from the two or more rotary axes based on the singular point distance calculated by the singular point distance calculation unit; and
   a pulse generation unit for generating a pulse for driving the control rotary axis based on the control rotary axis extracted by the rotary axis extraction unit,
   wherein the rotary axis extraction unit compares the singular point distances with a preset threshold to extract, as the control rotary axis, the rotary axis exceeding the threshold out of the two or more rotary axes, or comparing the singular point distances with each other to extract the rotary axis having a larger singular point distance out of the two or more rotary axes as the control rotary axis.

2. The numerical controller according to claim 1, wherein the pulse generation unit comprises a first pulse generation unit for generating a drive pulse for driving one control rotary axis so as to be closest to a designated direction commanded with the operation command by only the one control rotary axis when only the one control rotary axis is extracted by the rotary axis extraction unit, and a second pulse generation unit for generating a drive pulse for driving each of two control rotary axes so as to be closest to the designated direction commanded with the operation command when the two control rotary axes are extracted by the rotary axis extraction unit.

3. The numerical controller according to claim 1, wherein when the singular point distance is compared with the threshold, the rotary axis extraction unit extracts, as a singular point rotary axis, the rotary axis whose singular point distance is within the threshold, and
   the pulse generation unit comprises a third pulse generation unit for generating a drive pulse for driving the singular point rotary axis so as to cause the singular point rotary axis to rotate until a pre-specified angle.

* * * * *